(12) United States Patent
Hashiguchi et al.

(10) Patent No.: US 6,554,144 B2
(45) Date of Patent: Apr. 29, 2003

(54) BOOM POSITIONING DEVICE FOR HIGH-POSITION WORKING

(75) Inventors: Yukio Hashiguchi, Kitakyushu (JP); Shinji Murai, Kitakyushu (JP); Shinichi Ishikawa, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 10/130,303

(22) PCT Filed: Dec. 4, 2000

(86) PCT No.: PCT/JP00/08592

§ 371 (c)(1), (2), (4) Date: May 31, 2002

(87) PCT Pub. No.: WO01/40094

PCT Pub. Date: Jun. 7, 2001

(65) Prior Publication Data

US 2002/0179559 A1 Dec. 5, 2002

(30) Foreign Application Priority Data

Dec. 2, 1999 (JP) ............................................. 11/343923

(51) Int. Cl.⁷ ............................................. B66C 13/44
(52) U.S. Cl. ................................... 212/276; 212/285
(58) Field of Search ................................. 212/276, 285

(56) References Cited

U.S. PATENT DOCUMENTS

| 5,183,168 A | | 2/1993 | Fujimoto | |
|---|---|---|---|---|
| 5,731,974 A | * | 3/1998 | Pietzch et al. | 364/188 |
| 6,325,749 B1 | * | 12/2001 | Inokuchi et al. | 212/284 |

FOREIGN PATENT DOCUMENTS

| JP | 2-66266 | * | 3/1990 |
|---|---|---|---|
| JP | 6-108456 | * | 4/1994 |
| JP | 6-165326 | | 6/1994 |
| JP | 7-31023 | | 1/1995 |
| JP | 7-125991 | | 5/1995 |
| JP | 8-322120 | | 12/1996 |

\* cited by examiner

*Primary Examiner*—Thomas J. Brahan
(74) *Attorney, Agent, or Firm*—Armstrong, Westerman & Hattori, LLP

(57) ABSTRACT

A boom positioning device for high-position working, capable of ensuring a desired positional accuracy even in positioning a work location at the tip end of a boom from a distant place, the device comprising an imaging means (4) having a multi-axis driving unit and provided with a boom tip-end position computing means (2) for computing the position and attitude of the boom tip-end from positions of respective axes of the boom detected by a boom respective-axis-position detecting means (1) and with a distance measuring means (3) for detecting the distance from the boom tip-end position to a work object, a first boom working amount calculating means (11) for calculating, from an output from the distance measuring means (3) and an output from a measuring error judging means (10), a boom working amount up to an approach enabled area where the measuring accuracy of the distance measuring means (3) is guaranteed, and a second boom working amount calculating means (15) for calculating, from a distance from the boom tip-end position detected by the distance measuring means (3) up to a work object and from a specified work location and boom tip-end position with respect to the work object in the approach enabled area, a boom working amount up to a specified work location with respect to the work object.

1 Claim, 5 Drawing Sheets

… (1)

BOOM POSITIONING DEVICE FOR HIGH-POSITION WORKING

TECHNICAL FIELD

The present invention relates to a boom positioning device for high-position working for positioning the tip end of a boom for high-position working at a predetermined work location with respect to a work object.

BACKGROUND ART

In works such as power distribution works, engineering works, and construction works using high-position work platform vehicles, recently, in order to secure safety of workers and improve working efficiency, a robot is provided at the tip end of the boom of the high-position work platform vehicle, and from a place distant from an actual work site, a worker remotely operates the robot or monitors the automatic operation of the robot.

Particularly, in a high-position work platform vehicle for power distribution, for the purpose of a reduction in the worker's boom operation and improvement in robot working efficiency, a device which has a distance measuring means disposed on the boom to measure the distance to a work object, and automatically positions the boom tip end at a predetermined work location is proposed in Japanese Unexamined Patent Publications No. H07-31023 and No. H08-322120.

However, distance measurements in a case of an outdoor work, since measurements are made in disturbance of sunlight and backgrounds other than a work object within an accommodation space in which human safety is taken into account, long distance measuring accuracy is generally lowered. Furthermore, since mechanical errors due to deflection of the boom are additionally taken into account, one-time-only positioning at the work location cannot ensure the desired positional accuracy, and therefore, robot system working efficiency after positioning is significantly lowered.

DISCLOSURE OF INVENTION

An object of the invention is, therefore, to secure a desired positional accuracy even in positioning the tip end of a boom at a work location from a distant place.

In order to achieve the abovementioned object, the invention provides a boom positioning device for high-position working for positioning the tip end of a boom for high-position working at a predetermined work location with respect to a work object, comprising means for detecting the positions of the respective axes of the boom, means for computing the position and attitude of the boom tip-end from the positions of the respective axes of the boom detected by the boom respective-axis position detecting means, imaging means having a multi-axis driving unit and provided with means for measuring a distance from the boom tip-end position to a work object, attached to the boom, and view angle adjusting means, means for displaying images picked up by the imaging means, collimation drawing means for displaying a collimation for specifying a measuring object on the display means in a condition of overlapping with the measuring object, camera manual operating means for manually operating the imaging means so that the measuring object is overlapped with the collimation, measuring error judging means for judging whether or not the boom tip-end position is within a range with measuring accuracy guaranteed, first boom working amount calculating means for calculating a boom working amount to an approachable region in which the measuring accuracy of the distance measuring means is guaranteed based on an output of the distance measuring means and an output of the measuring error judging means, boom control means for operating the boom based on an output of the first boom working amount calculating means, viewpoint fixing working amount calculating means for calculating a working amount of the imaging means in order to fix the viewpoint of the imaging means during boom working, and second boom working amount calculating means for calculating a boom working amount to a predetermined work position with respect to the work object based on the distance from the boom tip-end position to the work object within the approachable region detected by the distance measuring means, the predetermined work position, and the boom tip-end position.

BEST MODE FOR CARRYING OUT THE INVENTION

Figure 1:
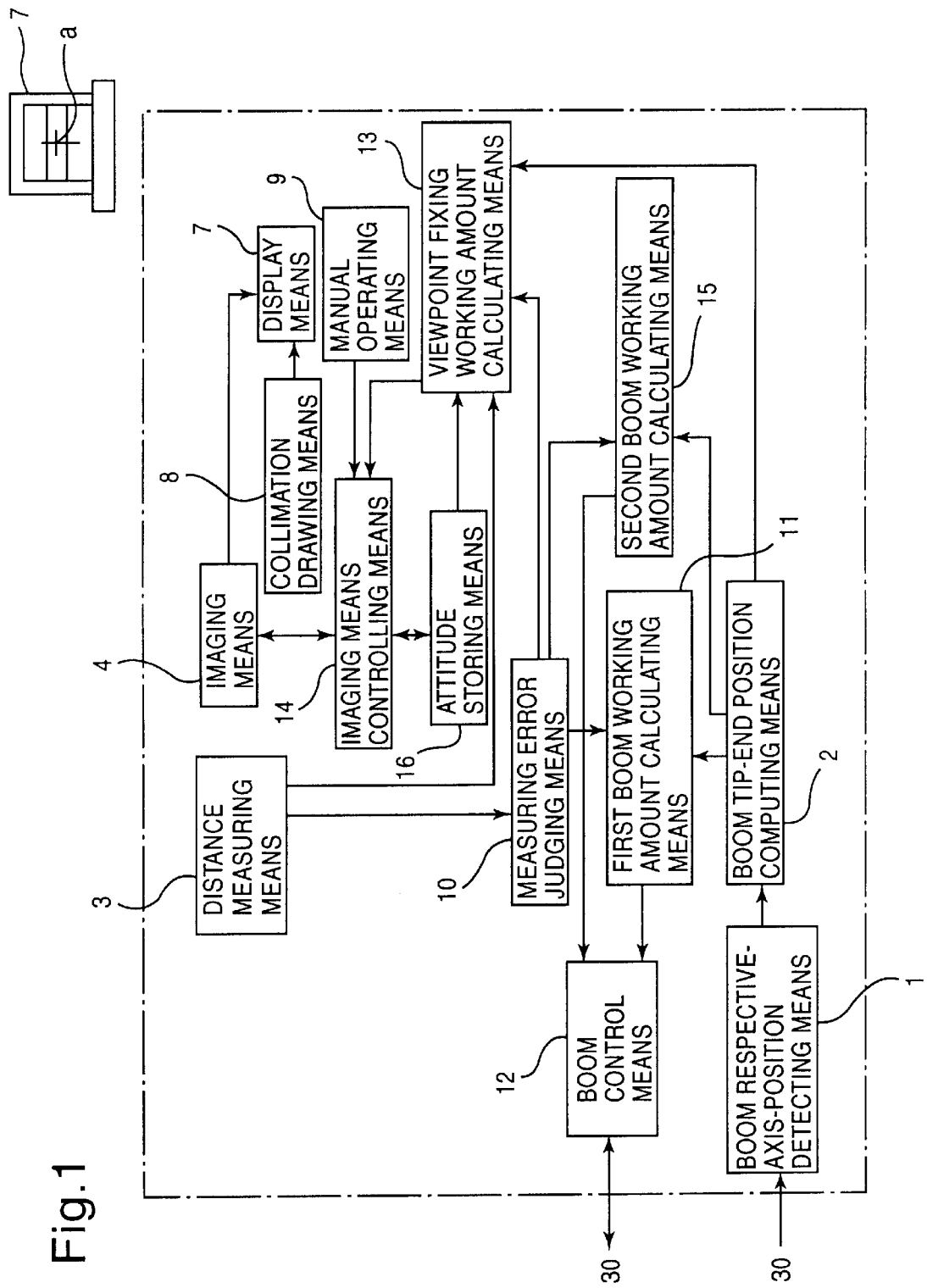
FIG. 1 is a block diagram showing a boom positioning device for high-position working relating to the present invention.

Hereinafter, an embodiment of the present invention is described with reference to the accompanying drawings.

First, the physical constructional view of a high-position work platform vehicle with a boom for high-position working attached is described with reference to FIG. 3. At the tip-end position 31 of the boom 30 attached to the high-position work platform vehicle 40, a manipulator 21 is disposed via a base 20, and an imaging means 4 is provided so that the attitude thereof is adjustable by a multi-axis driving unit 6. On the imaging means 4, a view angle adjusting means 5 and a distance measuring means 3 for detecting the distance from the boom tip-end position to a work object (electric wire 22) are installed. In the figure, the reference numeral 23 denotes a telegraph pole. By setting the frame of reference C of the vehicle as an absolute frame of reference, the coordinates X, Y, and Z of the manipulator 21 are set.

Figure 2:
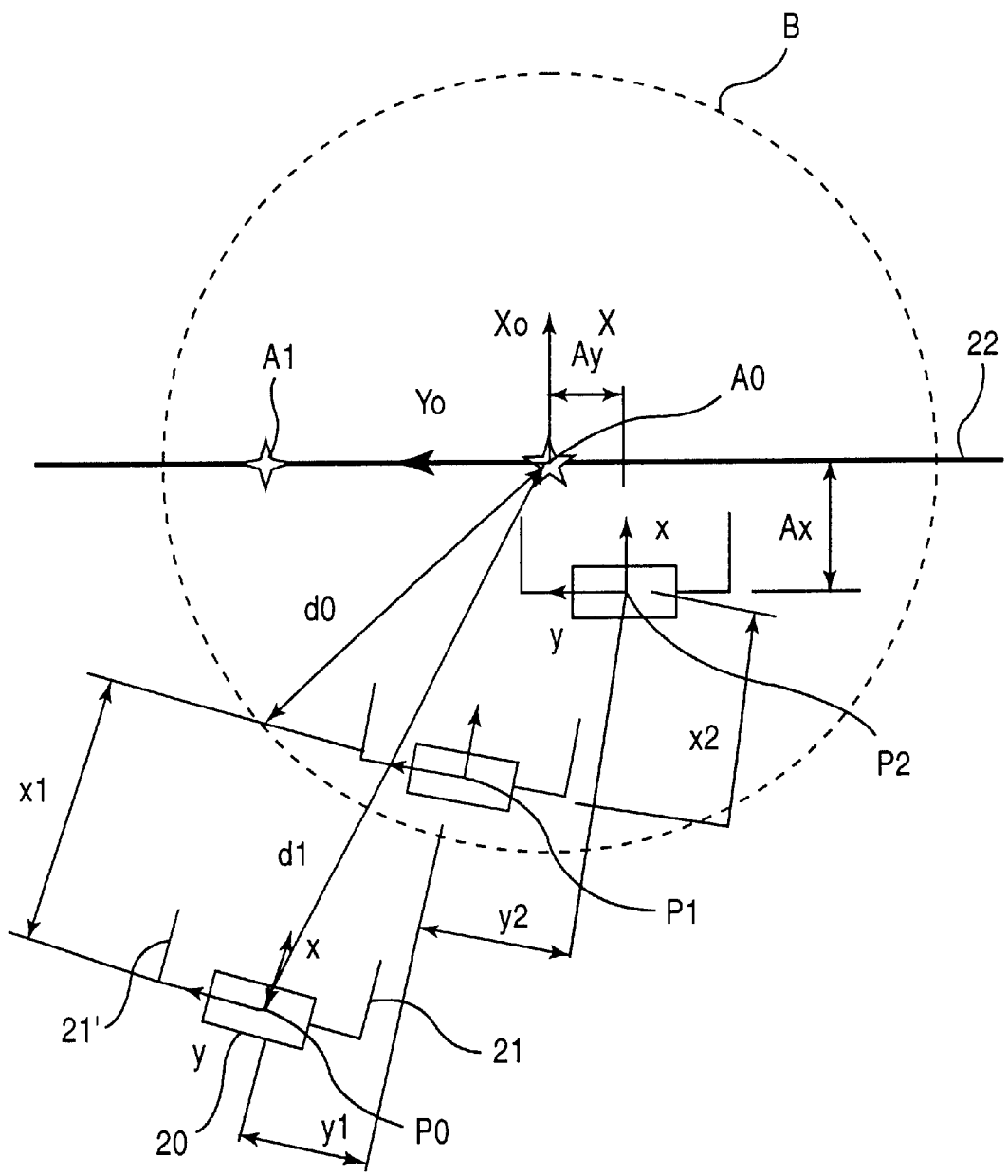
FIG. 2 is a conceptual drawing showing the outline of positioning operation to an electric wire by the boom positioning device for high-position working relating to the invention.
Figure 3:
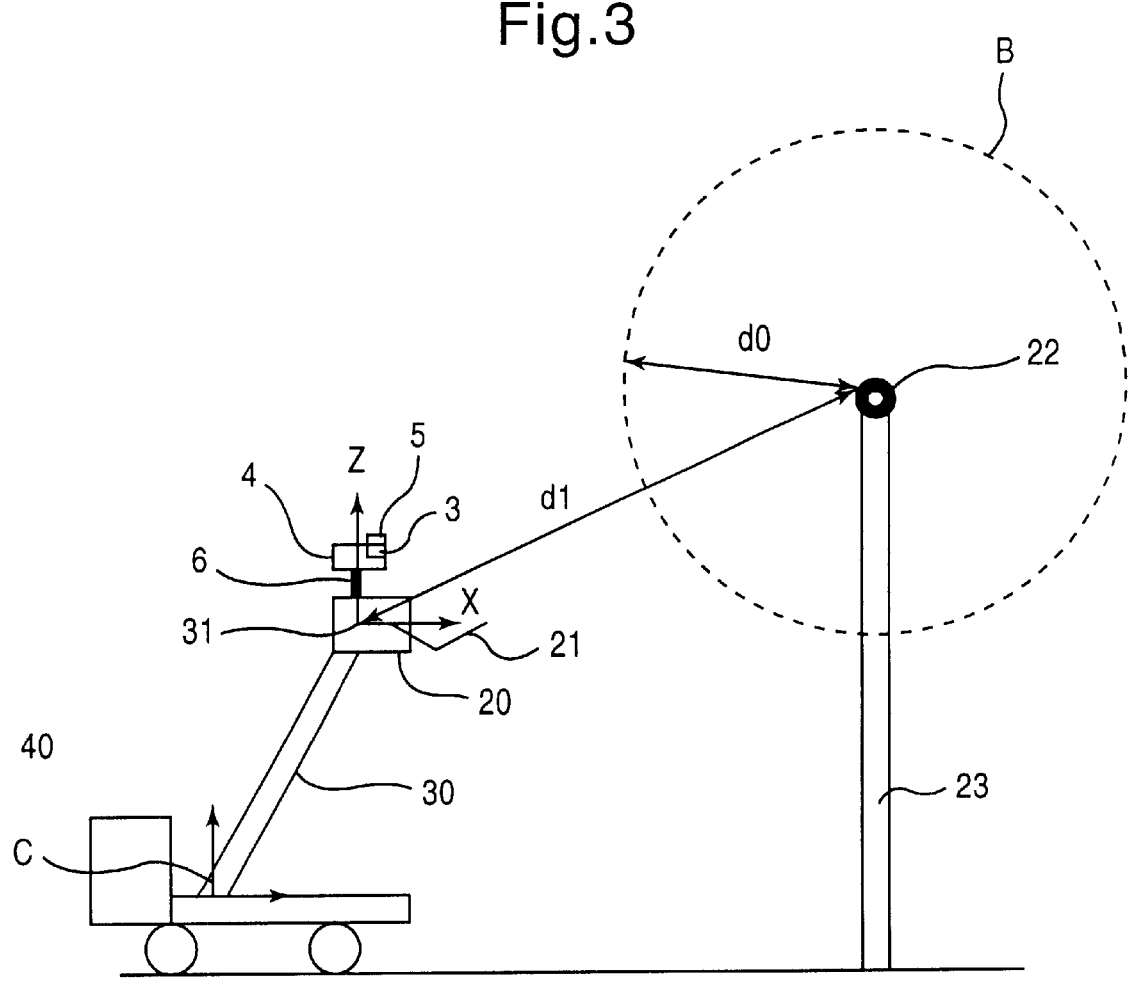
FIG. 3 is a side view of FIG. 2.
Figure 4:
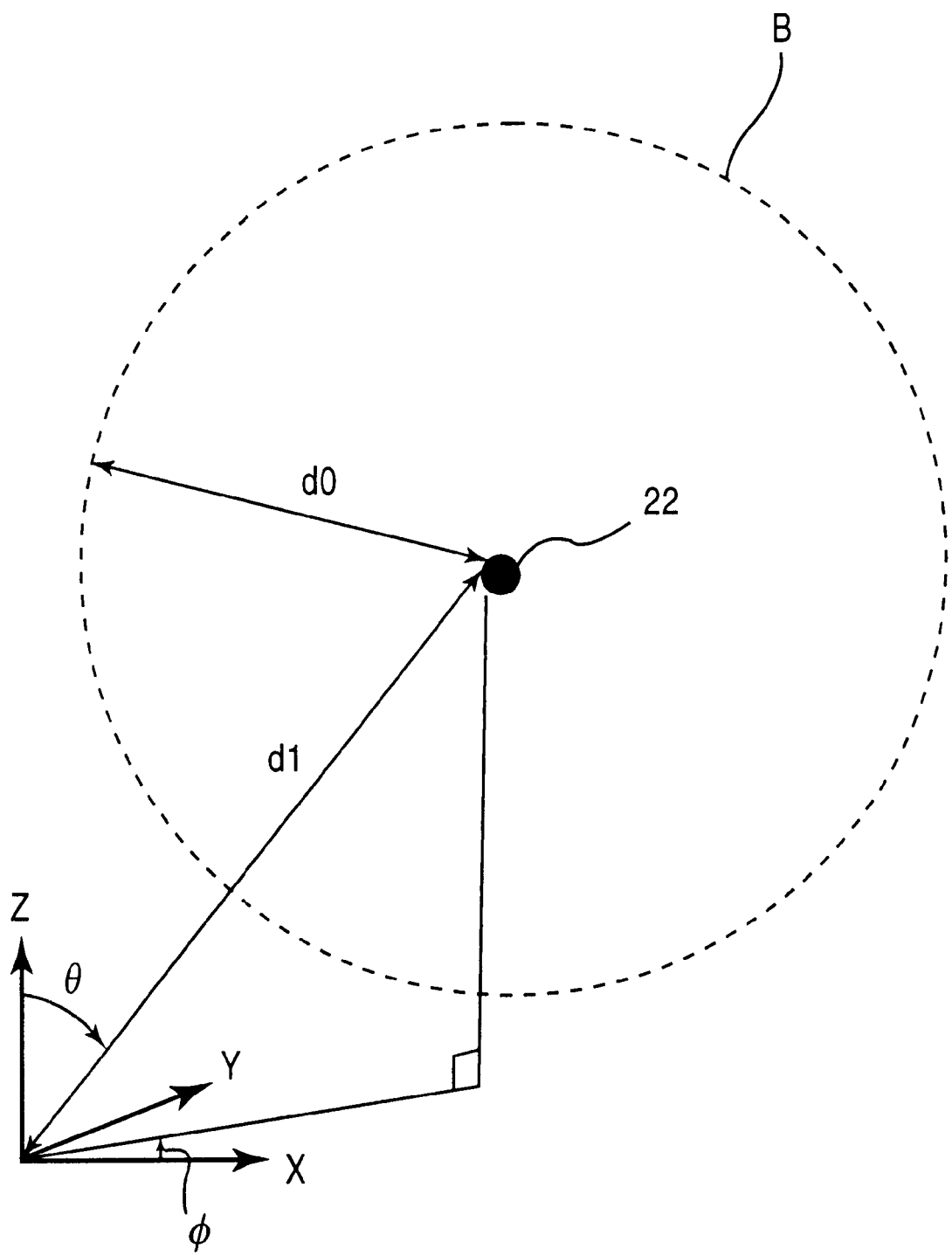
FIG. 4 is a detailed drawing of a frame of reference of FIG. 3.

FIG. 2 is a plan view of FIG. 3, wherein the reference symbol A0 shows a work object point on the telegraph pole, A1 shows a reference point for acquiring attitude data of the telegraph pole 22, P0 shows an initial position of the boom tip-end at the point of work start, the region B encircled by a dotted line circle with a radius of d0 shows an approachable region in which it is guaranteed that the measuring accuracy is within the range of permissible errors, P1 shows a first approach position which the boom tip-end position 31 approaches first when a distance measurement is made by the distance measuring means 3 from the outside of the approachable region B, and P2 shows a predetermined work position (second approach position) which the boom tip-end position 31 approaches second with respect to the work object point A0 determined by an instruction.

Figure 6:
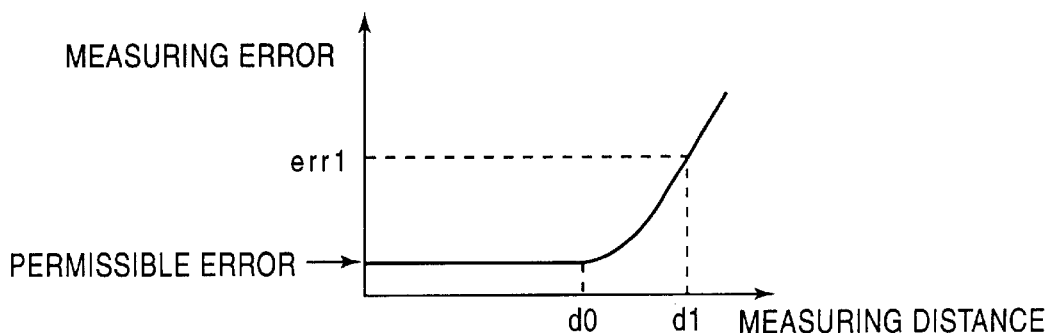
FIG. 6 is a diagram showing the measuring error property.

The electrical configuration of this boom positioning device for high-position working is shown in the block diagram of FIG. 1. In FIG. 1, the boom respective-axis-position detecting means 1 detects the positions of the respective movement axes of the boom 30, and based on the positions of the respective boom axes detected by the boom respective-axis-position detecting means, the boom tip-end position computing means 2 computes the position and attitude of the boom tip-end 31. The distance measuring means 3 is attached to the imaging means 4 and detects the distance from the boom tip-end position to the work object, the display means 7 displays images picked up by the imaging means 4, the collimation drawing means 8 indicates a collimation a for specifying a measuring object at the center of the display means 7 in an overlapping manner, and the camera manual operating means 9 is for manually operating the imaging means 4 so that the measuring object overlaps with the collimation a. The measuring error judging means 10 stores properties of measuring errors in accordance with the measuring distances of the distance measuring means 4 shown in FIG. 6 in advance. In FIG. 6, errors within the measuring distance d0 are in the range of permissible errors, and at the longer distance d1, the measuring error err1 exceeds the permissible error range.

The first boom working amount calculating means 11 calculates a boom working amount up to the approachable region B in which the measuring accuracy of the distance measuring means 3 is guaranteed based on an output of the distance measuring means 3 and an output of the measuring error judging means 10, and based on an output from the first boom working amount calculating means, the boom is operated by the boom control means 12. The viewpoint fixing working amount calculating means 13 calculates a working amount of the imaging means 4 in order to fix the viewpoint of the imaging means 4 during boom working, the imaging means control means 14 controls the driving unit 6 and view angle adjusting means 5 of the imaging means 4 based on outputs of the manual operating means 9 and viewpoint fixing working amount calculating means 13, the second working amount calculating means 16 calculates a boom working amount to the predetermined work position P2 with respect to the work object A0 based on the distance from the boom tip-end position 31 to the work object point A0 detected by the distance measuring means 3 within the approachable region B, the predetermined work position P2 and boom tip-end position 31 with respect to the work object point A0.

Figure 5:
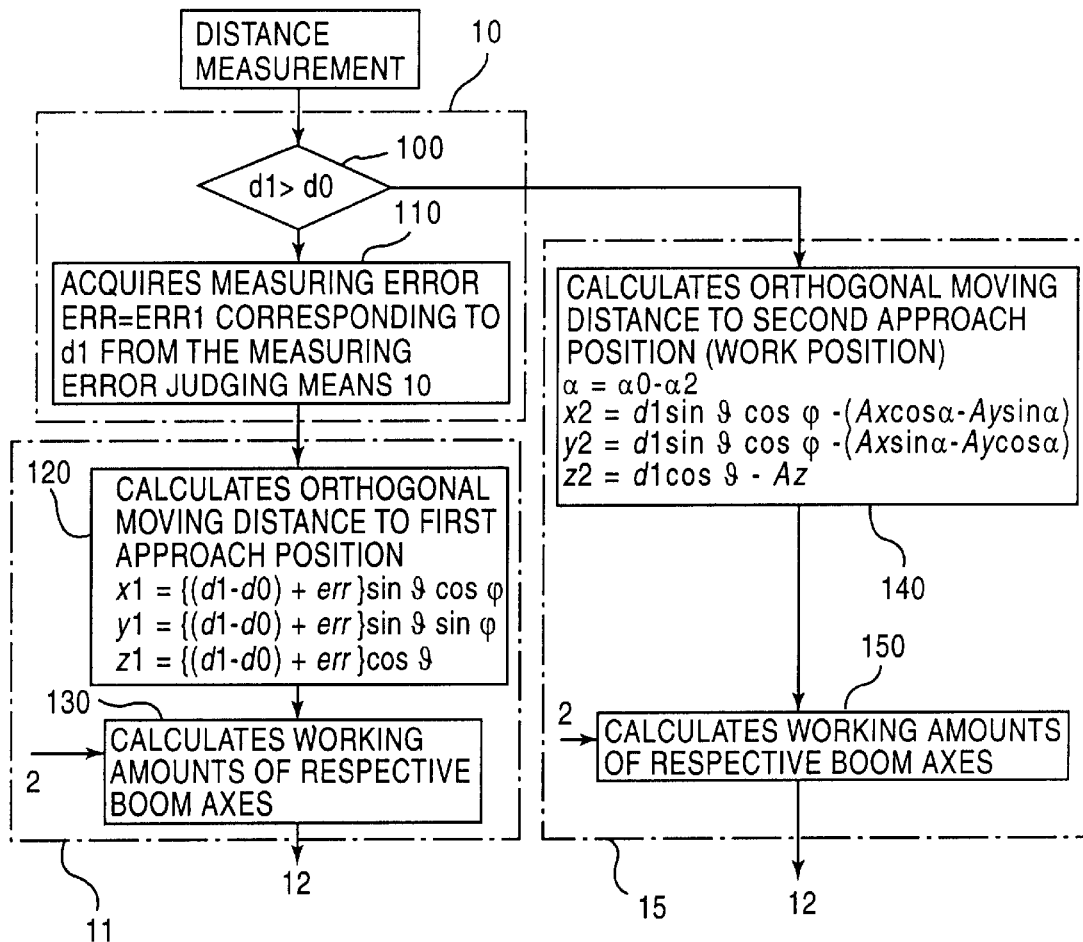
FIG. 5 shows an algorithm of a processing method by the first boom working amount calculating means and second boom working amount calculating means of the boom positioning device for high-position working relating to the invention.

Hereinafter, a detailed example of the device of the invention is described following the algorithms of FIG. 2 and FIG. 5.

First, at the initial position P0, the work object point A0 is matched with the collimation a at the center on the display means 7 while the imaging means 4 is operated by using the manual operating means 9, the distance d1 to the work object point A0 is calculated by using the distance measuring means 3, the work object point position computing means 17 computes the position of the work object point A0 from the distance d1 and an output of the boom tip-end position computing means 2 based on the vehicle frame of reference C, the attitude storing means 16 stores the position and attitude of the imaging means 4, and in the same manner, the distance d2 to the reference point A1 is measured. Next, the measuring error judging means 10 judges whether the boom tip-end position 31 is to be moved to the work position P2 through the first approach position P1 or to be directly moved to the work position P2 based on the distance d1. That is, as shown in step 100 of FIG. 5, it is judged whether or not the distance d1 exceeds the distance d0 at which the error is within the permissible range. As a result of judgement by the measuring error judging means 10, if the distance d1 does not exceed the distance d0, the movement is omitted since it is included in the second approaching movement in the case where the distance d0 is exceeded. Hereinafter, the case where the initial position P0 is outside the range of the approachable region B is described.

In step 110, a measuring error err=err1 corresponding to d1 is acquired from the measuring error judging means 10.

The first boom working amount calculating means 11 calculates a movement amount (x1, y1, z1) to the first approach position P1 in response to an output result of the measuring error judging means 10 (step 120), and calculates working amounts of the respective boom axes based on this movement amount (x1, y1, z1) and an output result of the boom tip-end position computing means 2. $\theta$ and $\phi$ show the angle between the direction of d1 and the Z axis and the angle between the direction d1 and the X axis when the direction of d1 is projected on the XY plane, respectively.

The boom control means 12 moves the boom 30 based on an output of the first boom working amount calculating means 11, and moves the boom tip-end position 31 to the first approach position P1. While the boom tip-end position 31 moves to the first approach position P1, the viewpoint fixing working amount calculating means 13 calculates a working amount of the imaging means 4 from the position of the work object point A0 based on the vehicle frame of reference C and an output of the attitude storing means 16, and based on the calculation result, the imaging means control means 14 moves the imaging means 4 so as to prevent the work object point A0 from disappearing from the field of view of the display means 7. At the first approach position P1, the imaging means 4 is finely adjusted by using the manual operating means 9 to match the work object point A0 with the collimation a at the center on the display means 7, the distance d1 to the work object point A0 is measured by using the distance measuring means 3, the position and attitude of the imaging means are stored in the attitude storing means 16, and in the same manner, the distance d2 to the reference point A1 is measured.

Next, the measuring error judging means 10 confirms based on the distance d1 that the boom tip-end position 31 is within the approachable region B, the second boom working amount calculating means 15 calculates a movement amount (x2, y2, z2) to the working position P2 (step 140), and based on this movement amount (x2, y2 z2) and the output result of the boom tip-end position computing means 2, calculates working amounts of the respective boom axes (step 150).

The boom control means 12 operates the boom 30 based on an output of the second boom working amount calculating means 15 to move the boom tip-end position 31 to the work position P2. While the boom tip-end 31 moves to the work position P2, the viewpoint fixing working amount calculating means 13 calculates a working amount of the imaging means 4 from an output of the boom tip-end position computing means 2, the position at the work object point A0 based on the vehicle frame of reference C, and an output of the attitude storing means 16, and based on the calculation result, the imaging means control means operates the imaging means so as to prevent the work object point A0 from disappearing from the field of view of the display means 7.

As described above, according to the invention, the approach movement is divided into two stages, wherein, in the first approach movement, measuring errors are taken into account, and while maintaining the visual fixed operation of the imaging means, the approach is achieved to the approachable region in which the distance measuring accuracy is guaranteed, and in the second approach movement, the imaging means is finely adjusted, re-measurements are made, and approach to the work position is achieved. Therefore, even in positioning at a work position from a distant place, a desired positional accuracy can be secured, and during approach movements, since the viewpoint of the imaging means is fixed to a work object point by taking measuring errors into account, the workload in the second re-measurements is lightened, whereby the working efficiency of the entire robot system is improved.

INDUSTRIAL APPLICABILITY

The present invention is useful as a boom positioning device for high-position working for positioning the tip-end of a boom for high-position working at a predetermined work position with respect to a work object.

What is claimed is:

1. A boom positioning device for high-position working for positioning the tip-end of a boom for high-position working at a predetermined work location with respect to a work object, comprising:

means for detecting respective axis positions of the boom;

means for computing the position and attitude of the boom tip-end from the respective axis positions of the boom detected by said boom respective-axis-position detecting means;

imaging means having a multi-axis driving unit and provided with means for measuring a distance from the boom tip-end position to the work object and view angle adjusting means, attached to the boom;

means for displaying images picked up by said imaging means;

collimation drawing means for displaying a collimation for specifying a measuring object on said display means in an overlapping manner at the center of the display means;

camera manual operating means for manually operating said imaging means so that the measuring object is overlapped with the collimation;

measuring error judging means for storing measuring errors in accordance with measuring distances of said distance measuring means and judging whether or not the boom tip-end position is within a range in which the measuring accuracy is guaranteed;

first boom working amount calculating means for calculating a boom working amount to an approachable region in which the measuring accuracy of said distance measuring means is guaranteed from an output of said distance measuring means and an output of said measuring error judging means;

boom control means for operating the boom based on an output of said first boom working amount calculating means;

viewpoint fixing working amount calculating means for calculating a working amount of said imaging means in order to fix the viewpoint of the imaging means during boom working; and second boom working amount calculating means for calculating a boom working amount to a predetermined work position with respect to a work object based on the distance from the boom tip-end position to the work object detected by said distance measuring means within the approachable region, the predetermined work position with respect to the work object, and the boom tip end position.

* * * * *